S. NEWBURGER.
AUTOMOBILE SAFETY DEVICE.
APPLICATION FILED DEC. 22, 1911.

1,137,519.

Patented Apr. 27, 1915.
2 SHEETS—SHEET 2.

WITNESSES

INVENTOR
Stephen Newburger
BY Munn&Co
ATTORNEYS

UNITED STATES PATENT OFFICE.

STEPHEN NEWBURGER, OF NEW YORK, N. Y.

AUTOMOBILE SAFETY DEVICE.

1,137,519.  Specification of Letters Patent.  Patented Apr. 27, 1915.

Application filed December 22, 1911. Serial No. 667,361.

*To all whom it may concern:*

Be it known that I, STEPHEN NEWBURGER, a citizen of the United States, and a resident of the city of New York, borough of Brooklyn, in the county of Kings and State of New York, have invented a new and Improved Automobile Safety Device, of which the following is a full, clear, and exact description.

My invention relates to a new and improved form of automatic safety device, and is particularly adapted for automobiles.

An object of my invention is to prevent tampering with the mechanism of the machine, and to render difficult the starting of the same by unauthorized persons. It quite frequently happens in cranking an automobile, that the ignition circuit is closed with the starting lever in operative position, causing the vehicle to move as soon as it is cranked, thereby endangering the operator. I attain the above outlined object by connecting the ignition circuit in series with some of the operating mechanisms, so that it will be impossible to complete the circuit through the spark plugs, unless all of the actuating mechanisms are in their normal positions.

Reference is to be had to the accompanying drawings, forming a part of this specification, in which similar characters of reference indicate corresponding parts in all the figures, and in which—

Figure 1:
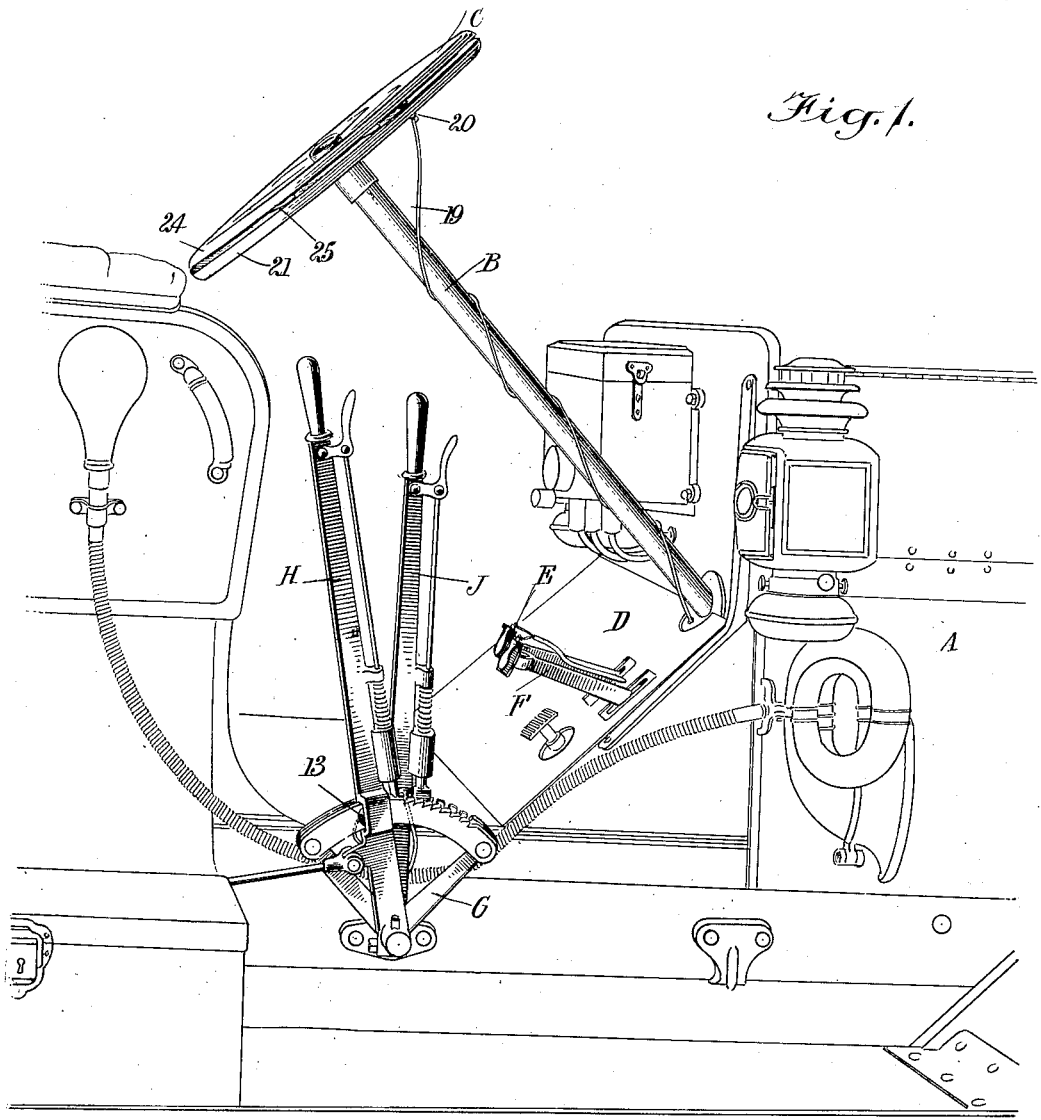
Figure 2:
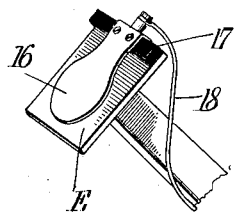
Figure 3:
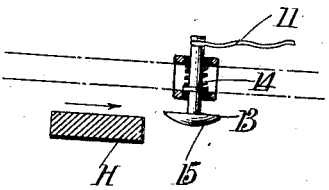
Figure 4:
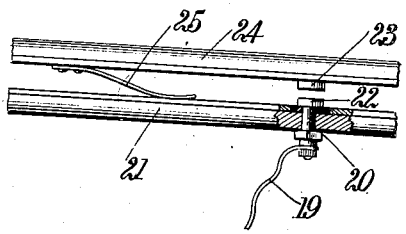

Figure 1 is a perspective view showing a portion of the body of an automobile with a preferred embodiment of my invention applied thereto; Fig. 2 is a detached perspective view of one of the brake control pedals showing a circuit closer applied thereto; Fig. 3 is a sectional view showing a form of circuit closer adapted to be positioned on the arc plate carrying the actuating levers; Fig. 4 is a side elevation of the form of circuit closer used on the steering wheel, and Fig. 5 is a diagrammatic view, partly in perspective, showing the ignition circuit attached to the different mechanisms.

Described more in detail, I have shown an automabile A, having a steering column B actuated by a steering wheel C, projecting upward from the dashboard D of which automobile extends a pair of pedals, one, a clutch pedal E and the other, a brake pedal F. Mounted on the side of the automobile, is a segment plate G, to which is pivoted a speed lever H and a brake lever J. The automobile carries within the hood thereof, an internal combustion engine, in the combustion chambers of which are disposed ignition plugs K energized by some suitable source of electric energy L. All of these parts are arranged as is usual with automobiles now in general use.

Figure 5:
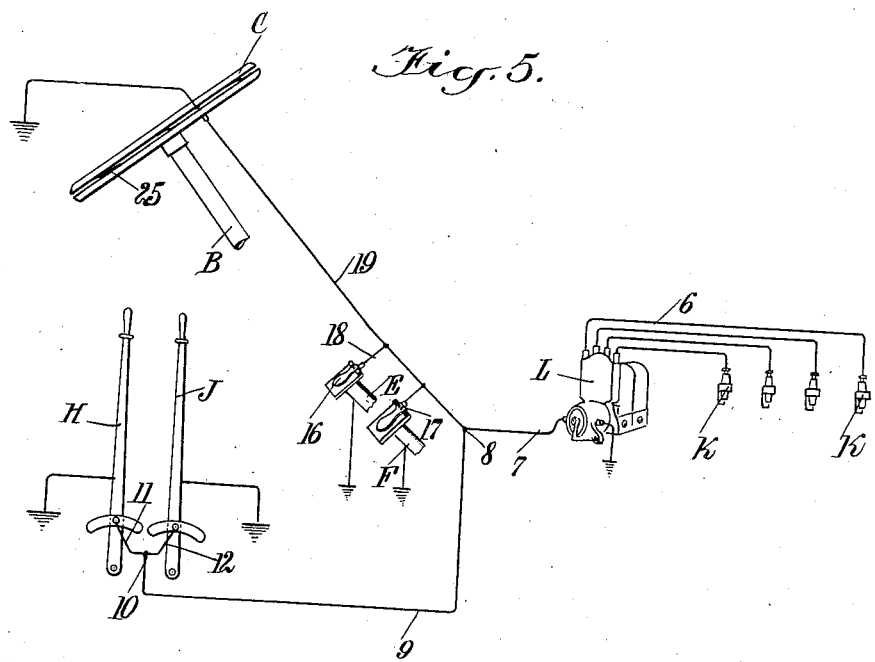

Referring more particularly to Fig. 5, I have shown an ignition circuit which is grounded on the metallic framework of the automobile. Starting from the cylinder of the engine carried by the framework, there is formed the customary spark gap at the ignition plugs K. Extending from each spark plug is a suitable conductor 6 leading to the source of electric energy L and leading from said source is a conductor 7 forked at 8, to form a conductor 9, which last named conductor is bifurcated at 10, one arm 11 of which extends to a location in juxtaposition to the speed lever H the other arm 12 of which is similarly positioned relative to the brake lever J. Each of the arms 11 and 12 leads to one end of a broad headed button (see Figs. 1 and 3) disposed transversely adjacent the arc of the segment plate G and is maintained in the projected position by means of a compression pin 14. The head 15 of this button is disposed in the line of movement of the lever H on the opposite side of the segment plate in line with the lever J, so that the actuation of the lever will complete the ignition circuit to ground the same on the framework of the vehicle.

When the vehicle is not in use, the circuit closers at the ends of the conductors 11 and 12 are so disposed relative to the speed lever H and brake lever J, that a circuit is completed at these points only when the speed lever is at its neutral point and the brake lever is in position with the brake applied.

It will be noted by the above outlined construction, that any movement of the levers H and J from the position at which they are placed when the operator leaves the machine, will break the ignition circuit, and on attempting to crank the machine, the attention of the operator will be called to the fact that said levers have been moved (if such is the case), and it will be necessary for him to apply the brake and to place the starting lever in its neutral position before it is possible for him to explode the charge in the combustion chambers of the engine.

When running the machine, it frequently happens that the operator loses control of the same, or in case of an accident, it frequently happens that the explosions continue. To avoid this, I so arrange the ignition circuit that it will be normally open and is closed in the act of operating the machine. With this end in view, I have shown two sets of circuit closers, one set disposed on the pedals E and F, and the other set disposed in the steering wheel of the machine. Described more in detail, I have placed on each of the pedals E and F, a broad face spring foot-plate 16 normally disposed out of contact with the pedals E and F and connected with said pedals by means of an insulated plug 17. The plates 16 are in circuit by means of conductors 18, with a conductor 19 connected to the conductor 7 at the fork 8. The conductor 19 leads to a pin 20 (see Fig. 4) disposed in the lower half 21 of the two-part steering wheel C. The top of the pin 20 is formed into a contact head 22 adapted to contact with a similarly-constructed head 23 depending from the upper half 24 of the wheel C, the contacting plates 22 and 23 being normally maintained in spaced-apart position by means of a suitable spring 25. The circuit is completed through the upper half 24 to the framework of the machine. It is to be understood from Fig. 5, that the representation of the ground is intended to indicate the framework of the machine or similar ground wire or conductor. It will be seen that by this arrangement, the actuation of the lever J will place the brakes in non-operative position, and in moving the speed lever to its different speed positions, the circuit is broken through these members, and it is necessary for the operator to either grasp the wheel C, to bring the leads 22 and 23 into contact, or to press on the clutch pedal E or brake pedal F, in order to complete the ignition. If, for any reason, he should release the pressure on all of these points, the circuit will be broken and the engine will, of course, cease running.

One feature of my invention contemplates, broadly, the provision of means, involving an electric cut out or switch directly included in the ignition circuit, to prevent the explosive engine of an automobile from being started when the engine is operatively connected with the vehicle drive wheels to propel the vehicle in either direction, whatever power or mechanism may be employed to turn over or crank the engine, and whatever devices may be employed in the automobile for throwing the engine into and from operative driving connection with said wheels, and whether or not such devices be operated or controlled by hand, foot, or other power.

Having thus described my invention, I claim as new and desire to secure by Letters Patent:

1. A safety device for automobiles, comprising a normally open ignition circuit, and means for closing said circuit, said means controlled by the speed lever of the automobile at its neutral point and by the brake lever of the automobile at its position applying the brakes, so that if the brakes are in non-operative position or the speed lever is in operative position, the circuit is open.

2. A safety device for automobiles, comprising a normally open ignition circuit, means for closing said circuit, said means controlled by the speed lever of the automobile at its neutral point and by the brake lever of the automobile at its position applying the brakes, and mechanism independent of either of said levers, by means of which said circuit may be closed.

3. A safety device for automobiles, comprising a normally open circuit, the framework of the automobile forming a grounded element of said circuit, the brake and speed levers, pedals and steering wheel being in electric circuit with said framework, and conductors leading from said framework to said levers, pedals and steering wheel, which members afford means for completing the ignition circuit.

4. A safety device for automobiles, comprising a normally open circuit, the framework of the automobile including the clutch and brake pedals forming the grounding element of said circuit, and plates insulated from and mounted on said pedals included in said circuit and affording means for closing said circuit when said plates are pressed into engagement with said pedals.

5. A safety device for motor vehicles comprising a normally-open ignition circuit on which the motor vehicle engine is started, manually-controlled motor-vehicle brake mechanism, and means for closing said circuit so that the engine can be started thereon, said means being actuated to close said circuit by and when said mechanism is in brake applying adjustment only.

6. A motor vehicle having an internal combustion engine, and manually controlled means for preventing propulsion of the vehicle by the engine, and an ignition circuit on which the engine is started, said ignition circuit being controlled by a normally-open switch included directly therein, said switch being controlled by said manually controlled means to close said ignition circuit when said means is in adjustment to prevent propulsion of the vehicle.

7. In a motor vehicle having an internal combustion engine, mechanism whereby the propulsion of the vehicle by the engine can be prevented comprising a foot lever, and a normally open ignition circuit on which said engine operates after being started, said circuit including a normally open switch arranged on said lever and closed by the pressure of the foot on said lever.

8. In a motor vehicle having an internal combustion engine, a member moved by the driver in operating the vehicle, an ignition circuit on which said engine operates after being started, said circuit including an automatically opening switch carried by said member and arranged to be necessarily closed by the driver of the motor vehicle in moving said member when operating said vehicle, whereby said ignition circuit will be automatically broken should the driver lose control of or be thrown from the vehicle.

9. In a motor vehicle having an internal combustion engine, and manually controlled means including a movable member on which the driver of the vehicle must apply pressure in moving the same to operate the vehicle, and an ignition circuit on which said engine operates after being started, said circuit including a switch directly connected therein and constantly tending to assume open position to break said circuit, said switch being positively moved by said member to automatically close said circuit by the manual pressure of the driver in operating said vehicle and to automatically open when said pressure is relieved.

10. In a motor vehicle having an internal combustion engine and vehicle controlling mechanism including a manually moved member, an ignition circuit on which said engine operates after being started, said circuit provided with a switch directly included therein and constantly tending to assume open position to break the circuit, said switch being so arranged with respect to said mechanism as to be manually held closed by the pressure of the driver on said member when operating the vehicle.

11. In a motor vehicle having an explosive engine, transmission mechanism, shifting devices therefor for operatively connecting the engine to drive the vehicle and for throwing the same out of operative vehicle driving connection, an ignition circuit on which said engine is started, and automatic means for preventing the starting of the engine when the engine is connected to drive the vehicle comprising an electric switch or cut out directly included in said circuit and mechanically connected with and positively moved by said devices to opened and closed positions, to automatically close said circuit and render the same operative when the engine is not connected to drive the vehicle and to automatically break said circuit and render the same inoperative when the engine is connected to drive the vehicle.

12. In a motor vehicle having an explosive engine, an ignition circuit for said engine and on which the same is started, transmission mechanism, shifting devices therefor comprising a speed lever, and automatic means to prevent said engine from being started when operatively connected to drive the vehicle comprising an electric switch or cut out for and directly included in said circuit and mechanically and directly connected to and operated by said lever to assume closed position only when said lever is in neutral position.

In testimony whereof I have signed my name to this specification in the presence of two subscribing witnesses.

STEPHEN NEWBURGER.

Witnesses:
W. S. ORTON,
PHILIP D. ROLLHAUS.